United States Patent [19]
Howard

[11] Patent Number: 4,822,216
[45] Date of Patent: Apr. 18, 1989

[54] PARTIAL HOLE THREADING SYSTEM

[75] Inventor: Billy G. Howard, Arlington, Tex.

[73] Assignee: Martin Sprocket & Gear, Inc., Fort Worth, Tex.

[21] Appl. No.: 203,276

[22] Filed: Jun. 7, 1988

[51] Int. Cl.4 .............................................. B23G 1/48
[52] U.S. Cl. ................... 408/54; 10/141 H; 408/72 B; 408/81; 408/241 B
[58] Field of Search ............. 408/54, 72 R, 72 B, 408/79, 80, 81, 85, 86, 103, 115 R, 115 B, 186, 195, 215, 241 R, 241 B; 10/141 H

[56] References Cited

U.S. PATENT DOCUMENTS

| | | | |
|---|---|---|---|
| 1,916,414 | 7/1933 | Chapman | 408/72 R |
| 2,052,924 | 9/1936 | Dutter | 408/54 |
| 2,670,639 | 3/1954 | Flowers et al. | 408/54 |
| 2,686,447 | 8/1954 | Vock et al. | 408/79 |
| 2,856,211 | 10/1958 | Firth | 287/52.06 |
| 2,905,212 | 9/1959 | Evans et al. | 408/72 R |
| 3,404,724 | 10/1968 | Baker | 164/138 |
| 3,648,343 | 3/1972 | Haller | 29/157.1 R |
| 3,677,583 | 7/1982 | Steinke | 287/52.06 |
| 3,790,374 | 2/1974 | Dedek | 75/208 R |
| 3,842,646 | 6/1974 | Kuhn | 72/354 |
| 3,982,934 | 9/1976 | Wentzell | 75/208 R |
| 4,525,094 | 6/1985 | Johnson et al. | 403/11 |
| 4,646,413 | 3/1987 | Nall et al. | 408/54 |

Primary Examiner—Gil Weidenfeld
Assistant Examiner—Daniel W. Howell
Attorney, Agent, or Firm—Robert A. Felsman

[57] ABSTRACT

Improved apparatus for threading a longitudinally divided partial hole in a machine component has a tap driving spindle selectively and reciprocally carried by a frame. On a base plate is a positioning means for holding the component in a predetermined relationship with the frame and locater means for accurately aligning the component with the tap driving spindle. A movable guide shoe that is operable in combination with the locater means opposes the partial hole to be threaded and forms temporarily an opposed partial hole that accurately guides the tap. Adjustment and retainer means are used for selective positioning of the guide shoe in relation to the tap guide hole.

3 Claims, 3 Drawing Sheets

PARTIAL HOLE THREADING SYSTEM

BACKGROUND OF THE INVENTION

1. Field of the Invention

This invention relates to methods and apparatus used to form threads in machine components—especially those in which threads must be formed in a partial, often a half, hole which intersects the peripheral edge of a component.

2. Description of the Prior Art

In the manufacture of machine components such as sprockets it is common to use bushings of differing sizes to minimize the number of sprockets required to accommodate the large variation in shaft sizes. This enables manufacturing efficiencies which would not be otherwise achieved.

One popular method for reducing manufacturing costs involves the compression of powdered metals in a die to accurate dimensions prior to sintering to the final metallurigcal consistency. The bushing used to adapt a sprocket to its supporting shaft is an example of a product that may be economically manufactured using powdered metal, as exemplified in U.S. Pat. No. 4,525,094, "Powdered Metal, Flanged Bushing for Securing Machine Elements to Shafts", June 25, 1985.

An earlier example of a bushing of commonly used configuration may be seen with reference to U.S. Pat. No. 3,677,583, "Bushing and Method of Manufacturing", July 18, 1972. Here, the bushings are tapered for use with hubs, each having a tapered internal wall corresponding to an external taper on an associated bushing. Screws are used in threaded holes formed between and intersecting the mating tapers to retain the bushing. This particular method of manufacture includes the steps of placing bushing blanks having the tapered surfaces together and drilling and tapping a single hole in the area of contact between them. Additional slots or grooves are formed on the periphery of each bushing blank, usually extending about one half the distance from one end of the blank to the other. These slots are also commonly formed by drilling, requiring an additional operation that adds to manufacturing costs. An improved method and apparatus for manufacturing powdered metal bushings and for forming the slots is disclosed in my copending patent application, "Method of Manufacturing Bushings with Pwodered Metals", Ser. No. 122,839, filed Nov. 19, 1987.

More importantly to this invention, the '583 patent discloses a method of fabricating tapered bushing for use with hubs that have a tapered internal wall corresponding to the external taper on the bushings. Each hub and tapered bushing is to be ultimately connected during the assembly operation with screws inserted in holes intersecting the tapered surfaces. The bushing manufacturing method includes the step of forming two essentially identical metal blanks, each having tapered external surfaces with a groove in the surface parallel with the axis of the blank. Then the two blanks are placed side-by-side with mating flat surfaces of their peripheries in contact and the grooves aligned to form a round hole, one half being in each bushing. Finally, the round hole is threaded to form a threaded half hole in each blank or bushing.

SUMMARY OF THE INVENTION

An object of this invention is improved apparatus for threading partial holes in machine components such as sprockets, timing pulleys and bushings.

The improved apparatus includes a frame which carries a tap driving spindle that may be selectively and reciprocally moved into engagement with a component having a partial hole to be threaded. Beneath the spindle is a base which supports a means for positioning and holding the component in a predetermined relationship with respect to the frame. Also, locater means are used for accurately aligning said component with the tap driving spindle. Operable in combination with the locator means is a movable guide to oppose the partial hole to be threaded. The guide shoe forms temporarily an opposed partial hole to accurately guide the tap. In addition there are other and more specific features, advantages and objects of the invention, as will become apparent from the following description.

DESCRIPTION OF THE PREFERRED EMBODIMENT

Figure 1:
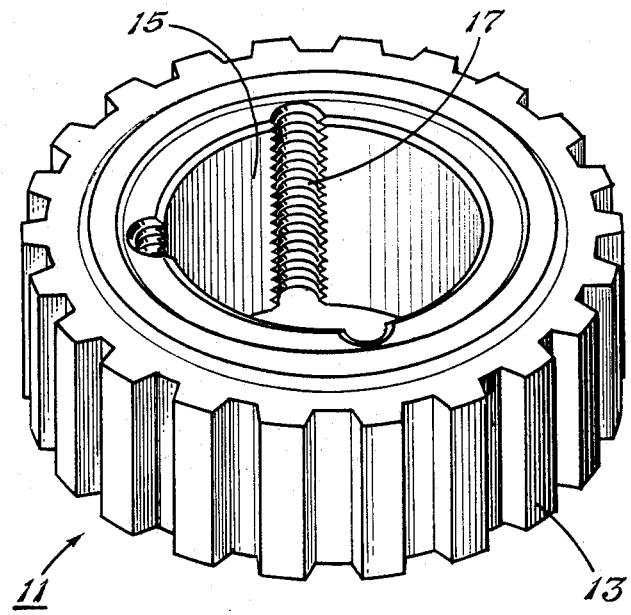
FIG. 1 is a perspective of a timing belt pulley having in its interior surface a half hole threaded for use in attaching the pulley to a bushing and ultimately to a shaft.

In FIG. 1 the numeral 11 designates generally a timing pulley having a toothed outer surface or periphery 13 and an inner surface 15 that includes a threaded slot or half hole 17. Threading a longitudinally divided half hole is difficult since the conventional tap used for threading tends to drift and inaccurately form the threads. FIG. 1 shows the threaded half hole 17 in the timing pulley 11 after being formed by the apparatus of the invention.

Figure 2:
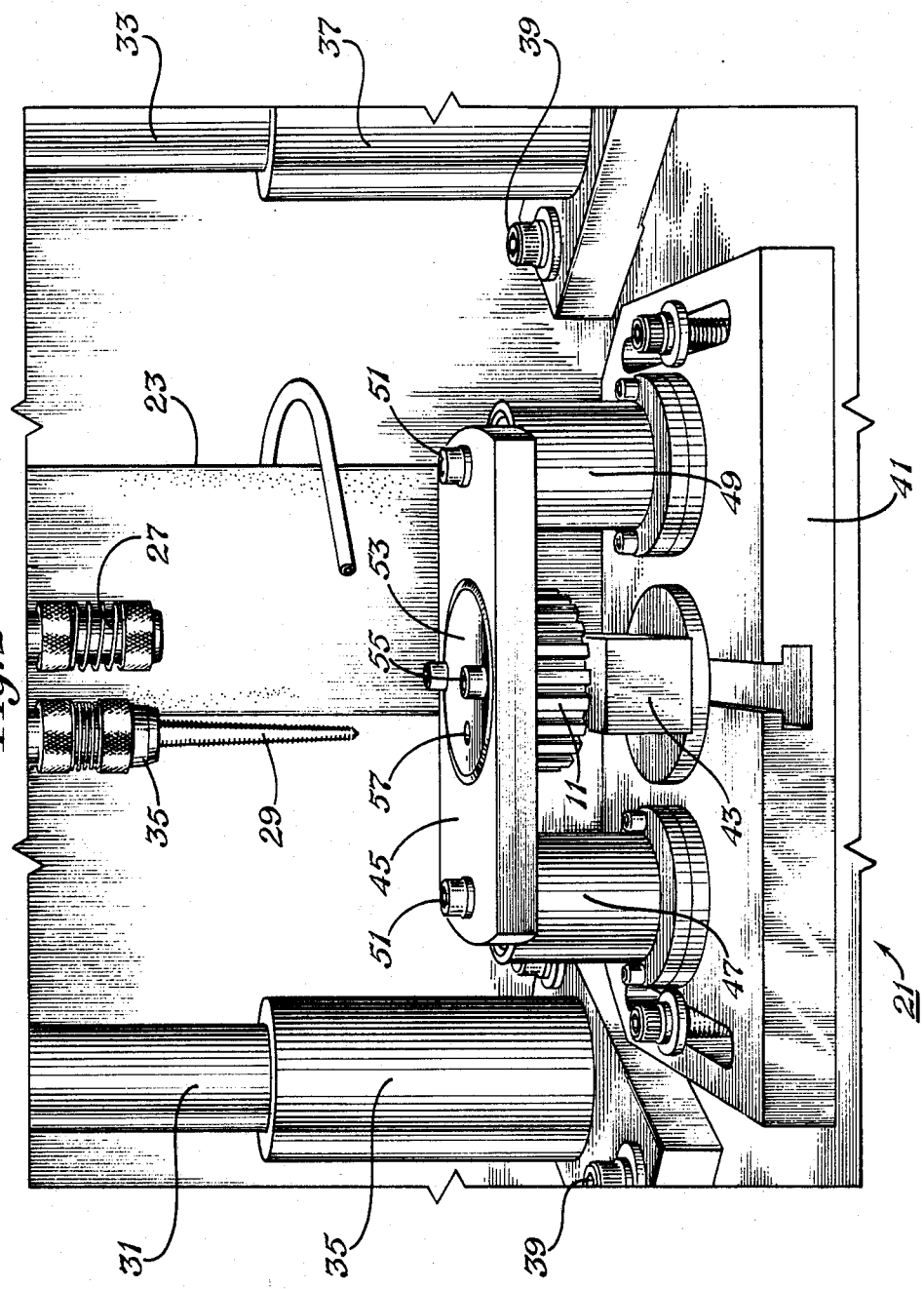
FIG. 2 is a view in perspective of the apparatus used to thread the half hole in the pulley.

The apparatus 21 of FIG. 2 has a frame 23 that supports in this instance multiple tap drive spindles 25, 27 of conventional configuration. A tap 29 is shown supported in one of the spindles, ready to be turned and lowered into the half hole to be threaded. Thus, the tap 29 and the spindles 25, 27 are reciprocally carried by the frame 23.

The spindles 25, 27 are reciprocally supported on a pair of stabilizing rods 31, 33 extending from blocks 35, 37 to an overhead cross arm (not shown). A number of fasteners such as 39 are used to secure the blocks to the frame 23.

The frame 23 supports a base plate 41 beneath the tap driving spindle 27 and tap 29. Upon the base plate 41 is a support means 43 for the timing pulley 11. Above the pulley 11 is a top plate 45 which may be reciprocated upward or downward by the power cylinders 47, 49, being connected to their respective rods (not shown) by the fasteners 51.

Confined by an opening in the top plate 45 is a locater means 53 which is secured by fasteners 55. Extending through the locater means 53 is a tap guide hole 57 that is accurately aligned with the tap driving spindle 27 and tap 29.

Figure 3:
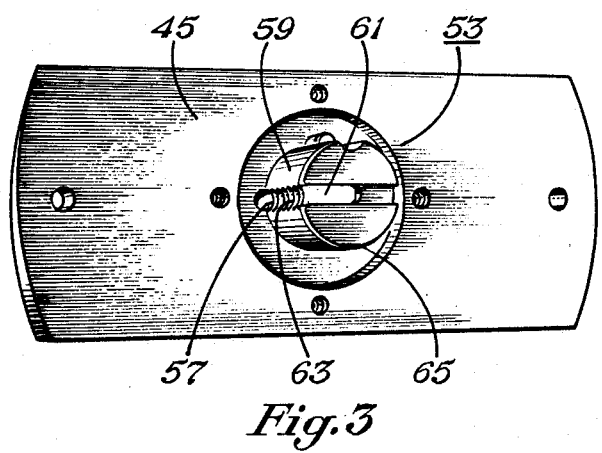
FIG. 3 is a view of the underside of a top plate used to support a locater means the accurately aligns a tap guide hole with a tap guide spindle and a guide shoe opposed the half hole in the component to be threaded.

In FIG. 3 is shown the underside of the top plate 45 that shows the underside of the locater means 53, which is composed of a pilot 59 and through which extends the tap guide hole 57. The pilot is sized to fit within inner surface 15 of the timing pulley of FIG. 1 and is used to accurately position the pulley in relation to the tap drive spindle 27 and tap 29. Within in a slot in the pilot 59 is a guide shoe 61 which has a threaded portion or edge 63, being secured to the pilot 59 by one or more fasteners (not shown) in receiving holes 65.

Figure 4:
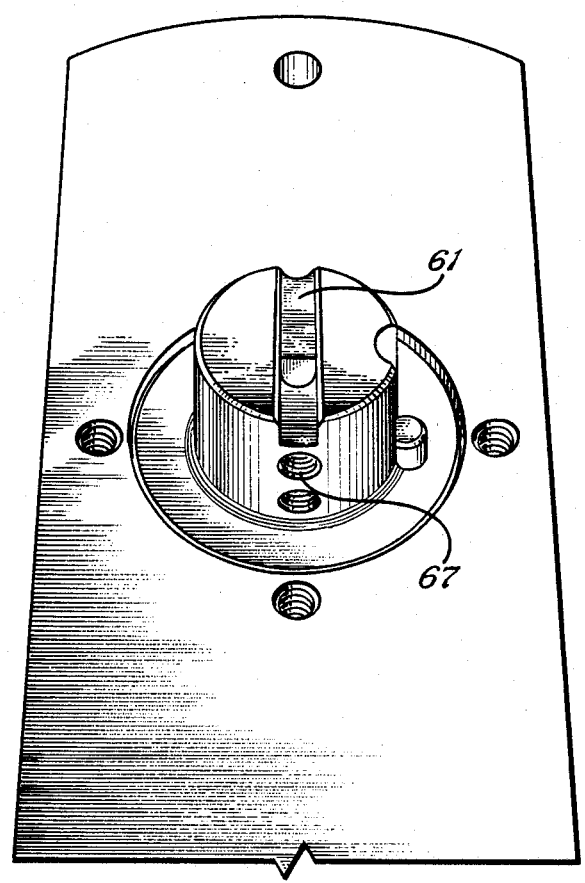
FIG. 4 is another view of the top plate and locater means of FIG. 3 as seen from a different angle to better shown the adjustment and retainment means for positioning the guide shoe.

A larger and different view of the pilot 59 and guide shoe 61 is shown in FIG. 4, where the threaded holes 67 are visible. In these holes are screws (not shown) that engage the guide shoe 61 to fix its lateral position. As a result, the pilot 59 has both adjustment and retainment means for selective positioning of the guide shoe 61 is relation to the tap guide hole 57.

Figure 5:
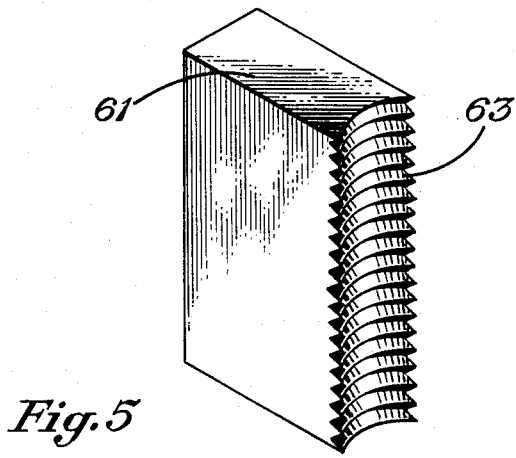
FIG. 5 is a view of the guide shoe.

The preferred form of the guide shoe 61 is shown in FIG. 5, where the threaded portion 63 is more clearly visible. The threads match those of the tap 29 and confine and guide the tap while forming threads in the half hole 17. The adjustability of the guide shoe 61 enables periodic compensation for wear in a convenient manner. Replacement is also readily achieved. The apparatus is easily adapted for threading partial holes in a variety of parts, including the exterior or outer surfaces of bushings such as those used to mount pulleys or sprockets to shaft. It may be used with piloted or unpiloted taps with equal facility.

While the invention has been shown in only one of its forms, it should be apparent to those skilled in the art that it is not thus limited, but is susceptible to various changes and modifications without departing from the spirit thereof.

I claim:

1. Apparatus for threading with a tap a longitudinally divided partial hole in a peripheral surface of a machine component, comprising:
   a frame for mounting the apparatus;
   a tap driving spindle reciprocally carried by the frame;
   a base plate supported by the frame beneath the tap driving spindle;
   means for positioning and holding said component in a predetermined relationship with the frame;
   locater means for accurately aligning said component with the tap driving spindle;
   a movable guide shoe operable in combination with the locater means to oppose the partial hole to be threaded and form temporarily an opposed partial hole to accurately guide the tap.

2. Apparatus for threading with a tap a longitudinally divided partial hole in the peripheral surface of a machine component, comprising:
   a frame for mounting the apparatus;
   a tap driving spindle reciprocally mounted on the frame;
   a base plate supported by the frame beneath the tap driving spindle;
   a top plate mounted on the base plate, including an opening and means for upward and downward reciprocal movements;
   means for holding said component beneath the opening of the top plate;
   locater means in the opening of the tap plate containing a tap guide hole for accurate alignment with the tap driving spindle;
   a pilot extending downwardly from the locater means into the component having a partial hole to be threaded
   a guide shoe in the pilot with a threaded portion to oppose the partial hole to be threaded and form temporarily an opposed partial hole registering with that in the component and the tap guide hole;
   whereby the tap may be inserted through the tap guide hole and confined by the guide shoe to accurately form threads in the partial hole in the component.

3. Apparatus for threading with a tap a longitudinally divided partial hole in the inner surface of a machine component such as a timing belt pulley or a sprocket, comprising:
   a frame for mounting the apparatus;
   a tap driving spindle reciprocally mounted on the frame;
   a base plate supported by the frame beneath the tap driving spindle;
   a top plate mounted on the base plate, including an opening and means for upward and downward reciprocal movements;
   means for holding said component beneath the opening of the top plate;
   locater means in the opening of the top plate containing a tap guide hole for accurate alignment with the tap driving spindle;
   a pilot of circular exterior extending downwardly from the locater means into the inner surface of component having a partial hole to be threaded, including a slot adjacent the tap guide hole;
   a guide shoe in the slot of the pilot with a threaded portion aligned with the tap guide hole to oppose the partial hole to be threaded in the component and form temporarily an opposed partial hole;
   the pilot having adjustment and retainment means for selective positioning of the guide shoe in relation to the tap guide hole;
   whereby the tap may be inserted through the tap guide hole and confined by the guide shoe to accurately form threads in the partial hole in the component.

* * * * *